United States Patent [19]
Powell

[11] Patent Number: 5,584,315
[45] Date of Patent: Dec. 17, 1996

[54] CHECK VALVE ASSEMBLY AND METHOD FOR MOUNTING AND INSTALLING CHECK VALVES WITHIN A HOUSING

[75] Inventor: Douglas H. Powell, Sacramento, Calif.

[73] Assignee: Ames Company, Inc., Woodland, Calif.

[21] Appl. No.: 573,770

[22] Filed: Dec. 18, 1995

[51] Int. Cl.⁶ ................................................ F16K 15/03
[52] U.S. Cl. ...................... 137/315; 137/218; 137/454.2; 137/512; 137/527; 137/614.2
[58] Field of Search ................................ 137/218, 315, 137/454.2, 512, 527, 614.2

[56] References Cited

U.S. PATENT DOCUMENTS

| | | |
|---|---|---|
| 4,054,153 | 10/1977 | Guyton . |
| 4,259,983 | 4/1981 | Kessel ................................... 137/512 |
| 4,284,097 | 8/1981 | Becker et al. ......................... 137/218 |
| 4,508,139 | 4/1985 | Teumer ................................ 137/527 X |
| 5,046,525 | 9/1991 | Powell . |
| 5,143,112 | 9/1992 | Scaramucci . |
| 5,156,183 | 10/1992 | Scaramucci . |

*Primary Examiner*—Gerald A. Michalsky
*Attorney, Agent, or Firm*—Lothrop & West

[57] ABSTRACT

A check valve assembly, including a check valve and an associated check valve mounting flange. Additionally, a backflow preventer is shown, which uses a pair of check valve assemblies transversely positioned within a tubular housing. Also disclosed is a method for installing a downstream check valve to a mounting flange, located within a remote, outlet chamber of the backflow preventer housing. The check valve has an elongated base plate, generally elongated in shape. The mounting flange is provided with an elongated hole, sized and configured to pass a properly oriented downstream check valve during installation and removal procedures. The location and design of the downstream check valve assembly ensures that during backflow conditions, the check valve compresses against the mounting flange in sealing engagement.

17 Claims, 7 Drawing Sheets

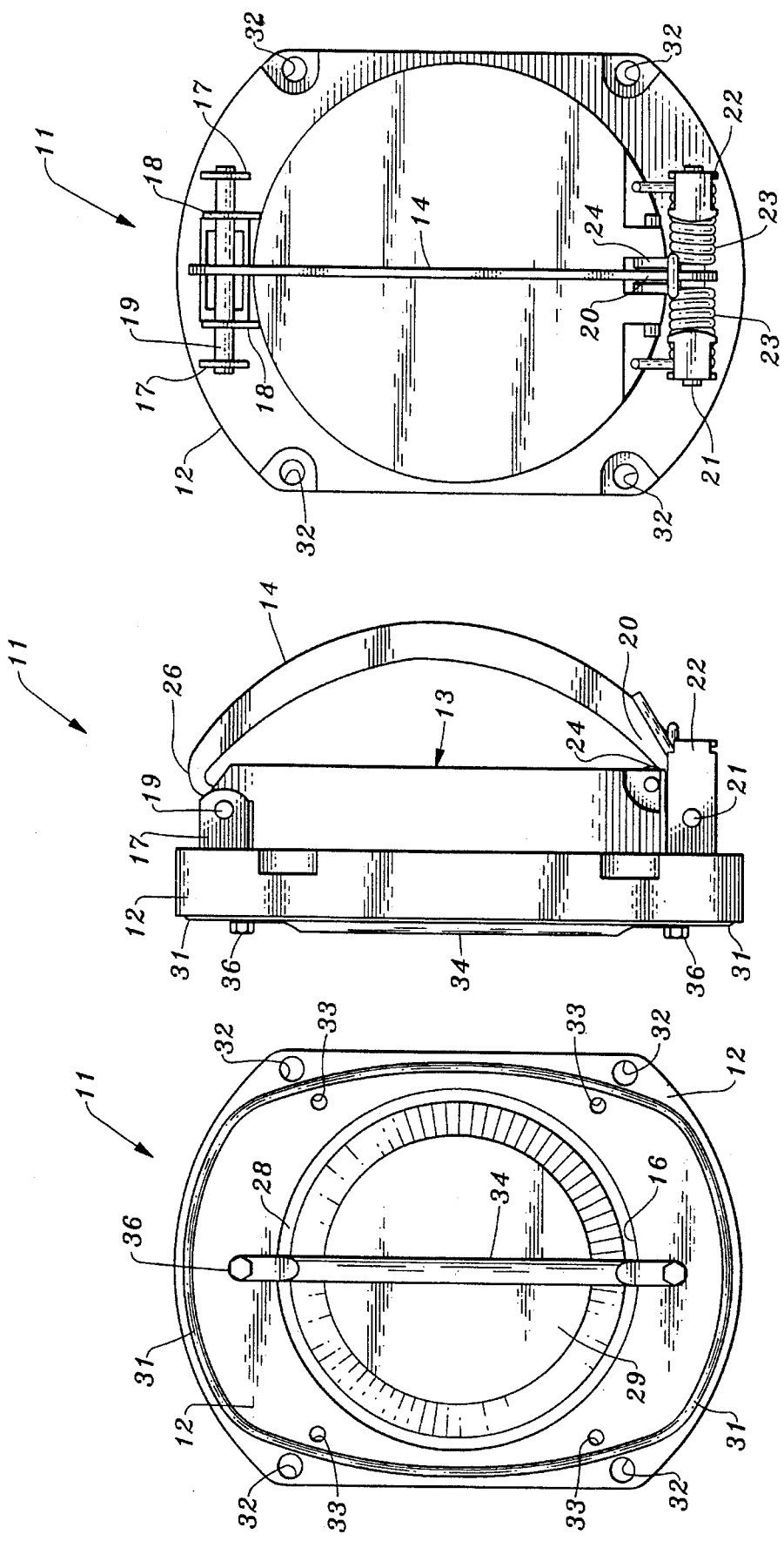

CHECK VALVE ASSEMBLY AND METHOD FOR MOUNTING AND INSTALLING CHECK VALVES WITHIN A HOUSING

FIELD OF THE INVENTION

The invention relates generally to the field of backflow preventers installed in water lines to prevent pollution of the water supply system during reverse siphoning, or backflow conditions. More specifically, the invention pertains to a check valve assembly installed within backflow preventers, exhibiting improved sealing characteristics during backflow conditions. The invention also pertains to a method for installing a check valve in a remote, outlet chamber of a backflow preventer housing, through a single access port in an intermediate chamber of the housing.

BACKGROUND OF THE INVENTION

Backflow prevention devices are installed in the main water supply lines leading to industrial and commercial water users, as well as apartment dwellers. These devices arrest any reverse flow of liquid pollutants from those facilities into the main water supply system, in the event of a catastrophic loss or drop in hydraulic pressure in the supply system.

A backflow preventer typically includes a pair of check valves, arranged serially within a valve housing. The housing includes an inlet port for connection to the water system supply line, and an outlet port for connection to the user's incoming water line. When a predetermined water pressure differential exists across the inlet and outlet ports, the force is sufficient to urge the clappers of both check valves into an open position, allowing water to flow freely therethrough. If an insufficient pressure differential exists, the clappers of both check valves are biased into a closed position. Providing the clappers of the closed check valves seal properly, a backflow of liquid, from the outlet port to the inlet port is prevented. A pair of check valves is commonly used for redundancy, in the event one of the valves fails.

There are two primary considerations in the installation and operation of these devices: (1) the need to install, service, and replace the check valves quickly and with relative ease; and, (2) the necessity for the check valves effectively to withstand the considerable pressure which may develop during backflow conditions.

This latter consideration is of particular concern, for example, in systems providing water to chemical or manufacturing plants, where a backflow of toxic liquid into the water supply system could pose a dangerous health hazard.

When water is flowing forwardly through a backflow preventer, the force acting upon the check valve mechanisms in the downstream direction is approximately two percent of the force applied to the valve in the reverse direction, under a backflow condition. Under forward flow conditions, the check valves are easily held or retained in place by conventional fasteners, such as nuts, bolts, screws, or threads. However, under backflow conditions and the much higher attendant forces, these fasteners may allow leakage around the check valve seal, or they may fail entirely. Since even minor leakage of toxins or pollutants could have serious consequences, the need exists for a mounting system which eliminates the possibility of seal compromise.

In prior art backflow preventers employing two check valves, the first, upstream check valve is normally adequately secured by conventional fasteners. This is the case because the base of the first check valve is typically mounted to an attachment structure, such as a flange, a fitting, or a tube, upstream from the base. Forward flow produces only small forces, insufficient to separate the check valve from the upstream attachment structure. And, under backflow conditions, the components which form the seal between the base of the check valve and the attachment structure experience higher compression, thus increasing the reliability of the seal and the integrity of the attachment.

However, a different consideration exists for the second, downstream check valve. In prior art backflow preventers having a line diameter of no greater than 2½", the base of the second check valve is mounted to an attachment structure, downstream from the base. As would be expected, this arrangement works well during normal, forward flow through the backflow preventer, as the sealing and mechanical attachment components are subjected to compressive forces. However, under the extreme forces cause by backflow pressure, the seal between the second check valve and its downstream attachment structure is challenged. An increase in back pressure applied against the second check valve tends to separate the base of the check valve from the attachment structure. Thus, for backflow preventers in relatively small lines, backflow conditions have exactly the opposite effect upon the integrity of the hydraulic seals between the upstream and downstream check valves and their respective attachment structures.

This potential for leakage increases with larger diameter lines and the greater forces attendant with such lines. Accordingly, prior art backflow preventers for supply lines larger than 2½" in diameter, employ two inspection ports in the backflow preventer housing. The second inspection port allows the downstream check valve to be mounted to an attachment structure upstream from the base of the valve. This arrangement provides the same enhanced seal reliability for the downstream check, as enjoyed by the upstream check valve during backflow conditions.

Unfortunately, the inclusion of a second inspection port is expensive, increases service time, makes the unit physically longer and provides an additional location where leaks can occur. It would therefore be beneficial to eliminate the need for this second inspection or access port, but retain the sealing advantage afforded by mounting the check valve to an attachment structure upstream from the base of the valve.

Accordingly, it is an object of the present invention to provide an improved backflow prevention device, which effectively resists backflow pressures exerted against it.

It is a further object of the present invention to provide a backflow prevention device having a single access port, permitting quick and easy installation and servicing of both check valves.

It is yet a further object of the present invention to provide a backflow preventer employing upstream and downstream check valve assemblies which are mounted to their attachment structures in the same relation, with respect to the direction of water flow.

It is another object of the present invention to provide check valves assemblies having retaining, sealing, and check valve mechanisms which are structurally and functionally compatible and interchangeable.

It is yet another object of the present invention to provide a method for installing a check valve in a remote, outlet chamber of a backflow preventer housing, through a single access port in an intermediate chamber of the housing.

SUMMARY OF THE INVENTION

In accordance with the present invention, an apparatus and a method are provided for effectively preventing the backflow of liquids through a fluid conduit. The apparatus herein includes an elongated backflow preventer housing, preferably containing two check valve assemblies arranged serially therein. The housing is essentially a tubular conduit, having inlet and outlet ports at either end for incoming and outgoing passage of a liquid through the conduit. A single access port is included within the sidewall of the housing between the inlet and outlet ports, providing selective entry within the interior of the housing. This single port is provided for installing, servicing, and replacing components of the two check valve assemblies.

Each check valve assembly includes a circular mounting flange, a check valve, and fasteners for interconnecting the valve to the flange. The mounting flanges are transversely disposed within the housing, on either side of the access port. Each flange includes a non-circular hole therethrough for the passage of liquid through the housing. The hole in the downstream flange also provides for the occasional passage of a downstream check valve during its installation and servicing.

The check valve employed herein includes a special base plate, having an elongated, planar configuration and a centrally positioned aperture for the passage of liquid. The base plate disclosed herein is substantially elliptical in elevation, although other configurations having an major elongated dimension and a lesser transverse dimension will work as well. A valve clapper is pivotally attached to one side of the base plate to form a hinged cover over the aperture. The upstream side of the clapper may include a keeper disc and a resilient ring seal. When the clapper is in a closed position, this seal seats within the aperture, engaging the face of the aperture and sealing the aperture against backflow.

In the preferred embodiment, an elongated, arcuate cam arm is also provided. The cam arm is pivotally attached on a side of the check valve mounting plate, opposite the pivot attachment of the clapper. The cam arm is spring biased toward the base plate, urging the underlying clapper into a closed position over the aperture. When a sufficient pressure differential exists across the check valve, the upstream force overcomes the spring bias, and the check valve is urged into an open position.

A particularly significant feature of the present invention is the elongated, or non-circular configuration of the check valve base plate. Another significant feature is the non-circular hole provided in the flange plate, through which the downstream check valve can be passed both for initial assembly, and for later servicing. These unique, non-symmetric configurations facilitate installation of the downstream check valve on a remote, downstream side of the mounting flange. This construction and method of assembly affords a tight seal during a backflow condition, when the base plate is compressed against the mounting flange.

Yet another feature of the disclosed check valve assembly, is a universal check valve construction which can be used both in upstream and downstream applications, when mounted to respective upstream and downstream mounting flanges. This feature simplifies both assembly and servicing, and reduces the number of replacement parts which must be kept on hand.

BRIEF DESCRIPTION OF THE DRAWINGS

FIG. 1 is a front elevational view of the check valve of the present invention, showing an optional gripping bar, which may be used on a downstream check valve;

FIG. 2 is a side elevational view of the check valve of FIG. 1;

FIG. 3 is a rear elevational view of the check valve of FIG. 1;

DETAILED DESCRIPTION OF THE PREFERRED EMBODIMENT

Figure 6:
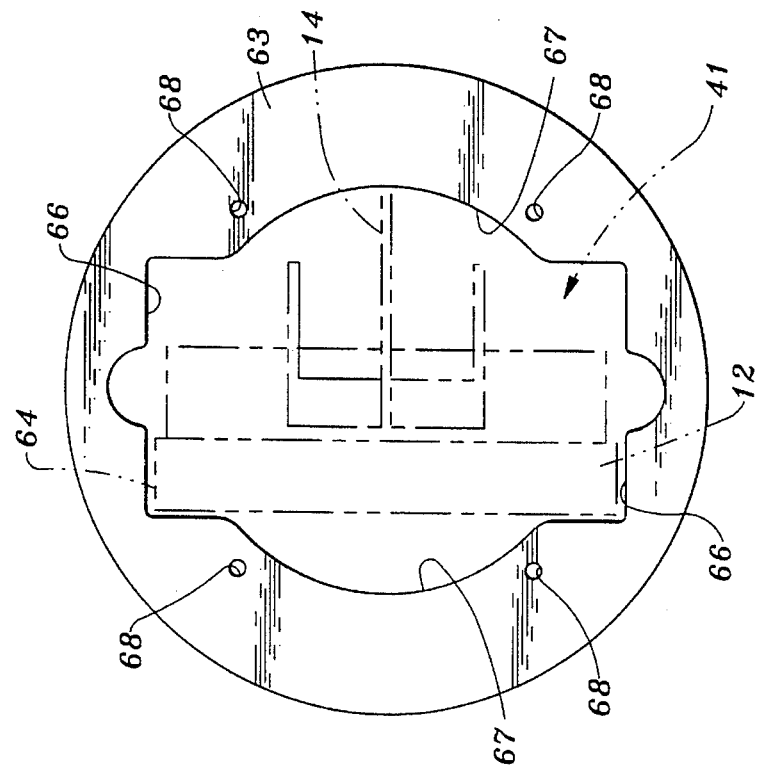
FIG. 6 is a front elevational view of a downstream mounting flange.
Figure 5:
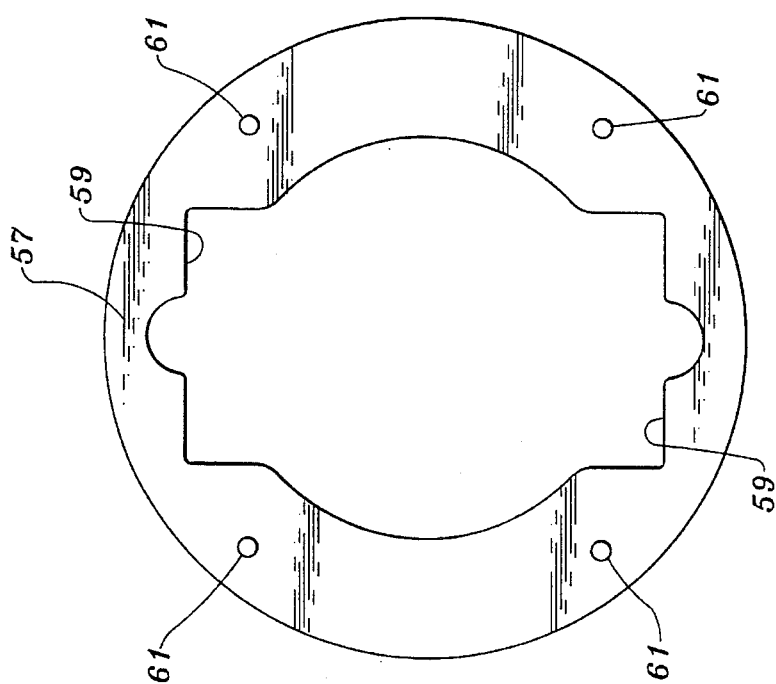
FIG. 5 is a rear elevational view of the flange of FIG. 4.
Figure 4:
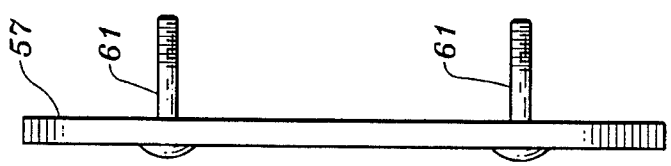
FIG. 4 is a side elevational view of an upstream mounting flange.

Turning now to the drawings, FIGS. 1 through 3 show a universal check valve 11, including an elongated, planar base plate 12, a circular clapper 13, and an arcuate cam arm 14. The clapper and clapper biasing mechanisms of the check valves for use herein may be of conventional design, such as a spring-biased poppet clapper, or a pivotally mounted clapper, spring or gravity biased to a closed position. However, applicant prefers using the differential loading fluid check valve construction shown in U.S. Pat. No. 5,046,525, having a common assignee herewith. The disclosure and subject matter of U.S. Pat. No. 5,046,525 are hereby incorporated by reference into the present application.

Check valve base 12 is generally elliptical in front elevation, having a major longitudinal dimension and a minor transverse dimension. The specific configuration is not critical as long as the base is elongated, having a transverse dimension which is less than the longitudinal dimension. This important characteristic allows the check valve to be oriented and manipulated into and out from an installed position in a manner which provides unique advantages and utility, to be described more fully herein.

Base 12 includes a circular aperture 16 for the passage of liquid through the check valve 11. Clapper 13 is pivotally mounted on one side of aperture 16 by a pair of base brackets 17 and a pair of clapper brackets 18, interconnected by a rod 19. A proximate end 20 of cam arm 14 is pivotally mounted on a shaft 21, supported by a pair of cam brackets 22 located on the other side of aperture 16. A spring 23, encircling shaft 21 and having portions on either side of cam arm 14, biases a remote end 26 of the cam arm toward base 12.

A roller 24 is rotatably mounted on an outer edge of clapper 13, effective to engage an inner surface of cam arm 14. As shown in FIG. 2, when the remote end 26 of cam arm 14 is adjacent base 12, arm 14 impinges upon roller 24 and maintains clapper 13 in a closed position over aperture 16.

Figure 7:
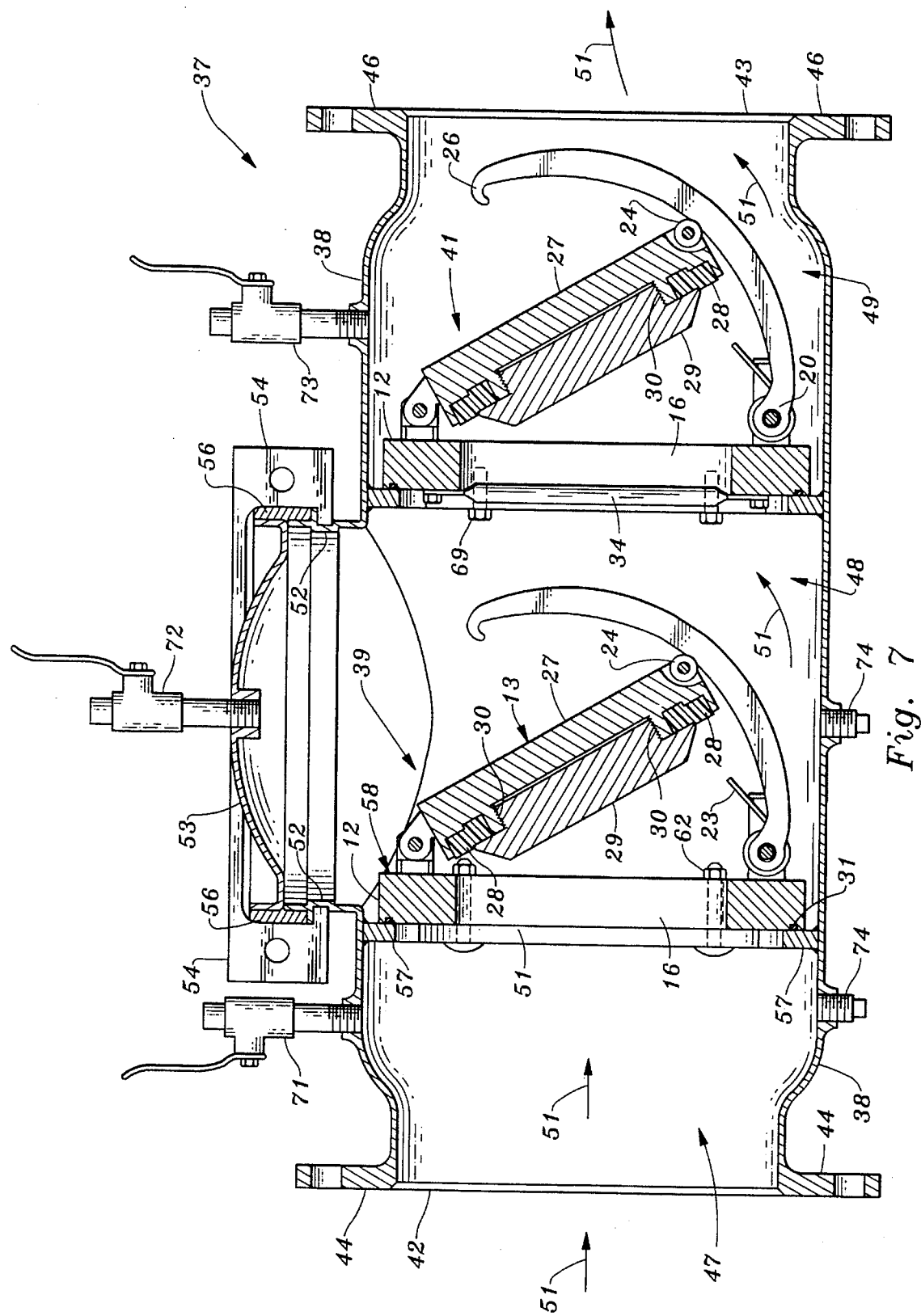
FIG. 7 is a longitudinal, cross-sectional view of a backflow preventer, showing both upstream and downstream check valve assemblies, with the respective check valves in open positions.

As shown most clearly in FIG. 7, clapper 13 includes a base disc 27, an annular seal 28, and a seal keeper 29. Threads 30 are provided in contingent, circular wall portions of disc 27 and keeper 29, to secure the clapper assembly together and allow replacement of seal 28. Disc 27 and keeper 29 are preferably manufactured from a hard plastic material, whereas seal 28 is manufactured from a resilient rubber material, or the like. With clapper 13 urged into a closed position by arm 14, seal 28 is maintained in tight sealing relation over aperture 16.

An O-ring 31 is provided in the front face of base plate 12 for sealing engagement with a mounting flange, to be discussed below. Four upstream mounting holes 32 are arranged around the periphery of base 12. Mounting holes 32 pass entirely through plate 12. Four downstream mounting holes 33 are located radially inwardly from respective holes 32, just inside the boundary defined by O-ring 31. Mounting holes 33 are tapped, but do not pass entirely through plate 12. A gripping bar 34, secured by bolts 36, may optionally be mounted across the forward face of plate 12, to assist in handling check valve 11.

The check valve 11 of the present invention is advantageously used in conjunction with a special mounting flange, the combination herein being termed a check valve assembly. Typically, one or more of the check valve assemblies is transversely mounted within a tubular housing, allowing passage of water therethrough in a forward direction only. This device, termed a backflow preventer in the industry, is serially interconnected within a main water supply line leading to commercial or industrial users of water.

Turning now to FIG. 7, it will be noted that an upstream check valve assembly 39 and a downstream check valve assembly 41, are serially positioned within a backflow preventer 37. Backflow preventer 37 includes an elongated, tubular housing 38, either manufactured as a single, unitary casting, or comprised of several components, specially formed and welded together. As shown herein, housing 38 is manufactured entirely from pieces of stainless steel material, owing to its high strength, low weight, and resistance to corrosive effects.

Housing 38 includes an inlet port 42, an outlet port 43, an inlet flange 44, and an outlet flange 46. Flanges 44 and 46 facilitate attachment of backflow preventer 37 to corresponding flanges on a main water supply line. Housing 38 also includes an inlet chamber 47, an intermediate chamber 48, and an outlet chamber 49, together defining a forward liquid flow path therethrough, indicated by numeral 51.

A service port 52 is provided within the sidewall of housing 38, between inlet port 42 and outlet port 43. A domed cover 53 is secured in place over port 52, by a split ring 54. Only one half of the split ring is evident in FIG. 7. A pair of bolts (not shown), compresses each half of the split ring against a circular, resilient gasket 56. Removal of ring 54 and cover 53 allows selective access to intermediate chamber 48, for assembly and servicing of backflow preventer 37.

During initial assembly of preventer 37, downstream check valve assembly 41 is first installed, followed by upstream check valve assembly 39. For later servicing, assembly 39 may be removed and reinstalled independently from assembly 41. However, as will explained more fully below, servicing of assembly 41 will require first that assembly 39 be removed.

Figure 15:
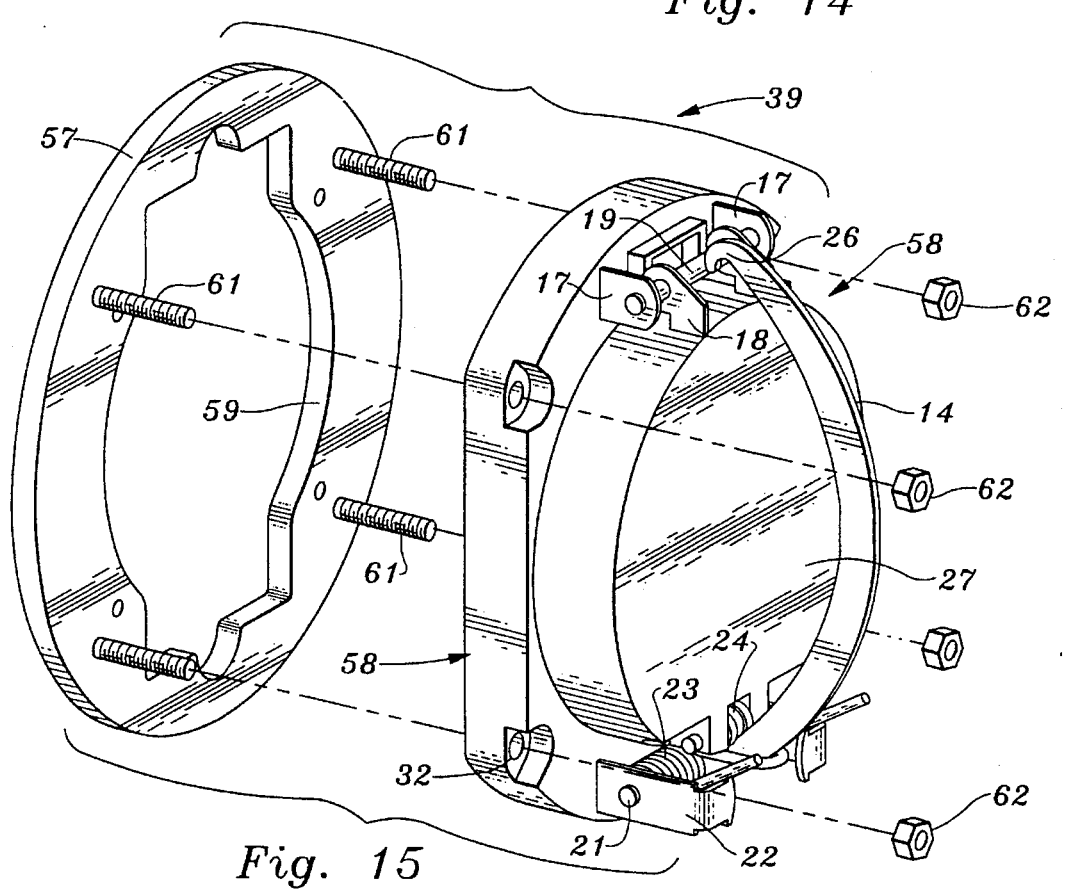

Upstream check valve assembly 39 includes an upstream mounting flange 57 and an upstream check valve 58 (see FIG. 15). Flange 57 is mounted transversely within housing 38, defining a wall boundary between inlet chamber 47 and intermediate chamber 48. Flange 57 is provided with an elongated hole 59 for passage of the liquid flow path 51, through the flange. Four mounting bolts 61 are welded to flange 57, and are arranged in spaced relation around hole 59.

Upstream check valve 58 is constructed in essentially the same manner as previously described check valve 11, shown particularly in FIGS. 1–3. The only feature of valve 11 which is unnecessary for valve 58 is gripping bar 34. Making reference to FIGS. 7 and 15, it will be appreciated that by grasping cam arm 14, check valve 58 can be lowered through service port 52 into intermediate chamber 48, and installed flush against mounting flange 57. Bolts 61 pass through holes 32, leaving a threaded portion extending through base plate 12. Nuts 62 are then threaded onto bolts 61, securely fastening check valve 58 to mounting flange 57. O-Ring 31 is thereby compressed into sealing engagement with mounting flange 57, completing the installation of check valve 58.

Figure 14:
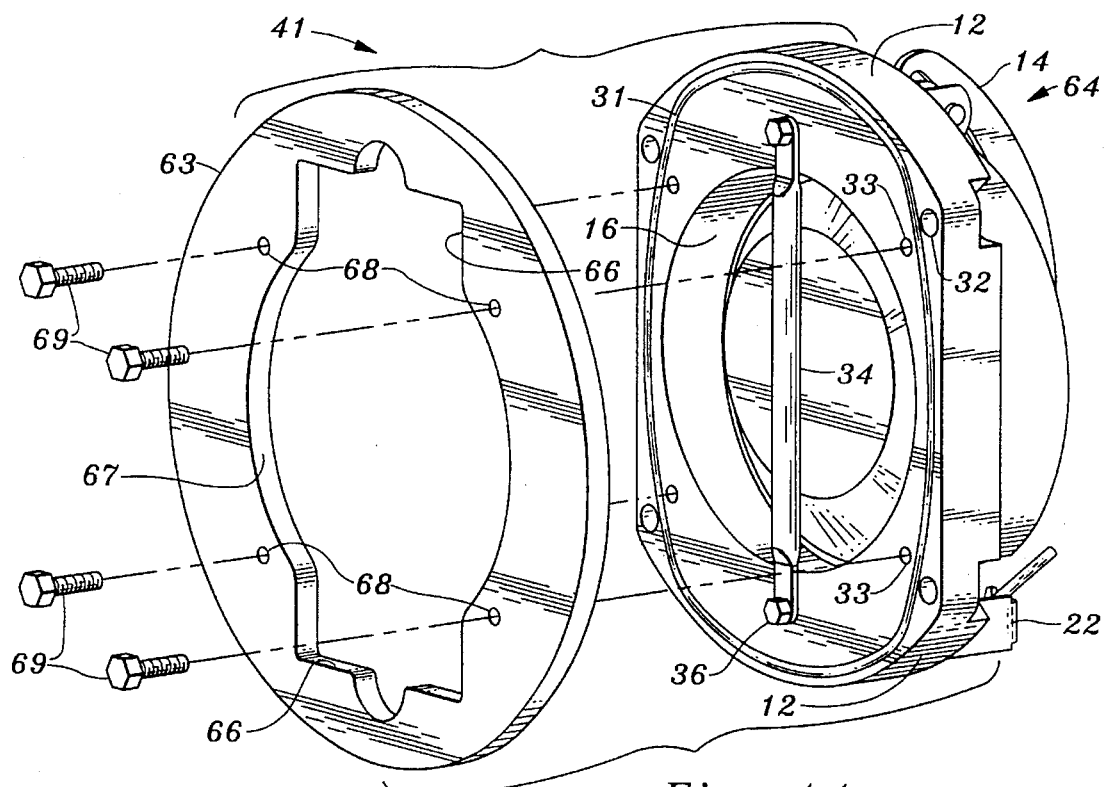
FIG. 14 is an exploded, left-front perspective view of a downstream check valve assembly, showing the gripping bar; and, FIG. 15 is an exploded, right-front perspective view of an upstream check valve assembly.

Downstream check valve assembly 41 includes a downstream mounting flange 63 and a downstream check valve 64 (see FIG. 14). Flange 63 lacks mounting bolts 61, but is otherwise identical in size and configuration to flange 57. As shown in FIG. 7, flange 63 is also mounted transversely within housing 38, and defines a wall boundary between intermediate chamber 48 and outlet chamber 49. Flange 63 is provided with an elongated hole 66, identical in size and configuration to hole 59, but having an important additional function in the practice of the present invention.

Hole 66 is dimensioned and shaped to pass a properly oriented downstream check valve 64, both for purposes of initial assembly of backflow preventer 37, and for later servicing of check valve 64. Making particular reference to FIG. 6, it will be noted that hole 66 has a generally rectangular shape, modified by arcuate sidewall cutouts 67. The elongated dimension of hole 66 is sufficient to accommodate the transverse dimension of base plate 12 of check valve 64. And, the transverse dimension of hole 66, including cutouts 67, is sufficient to accommodate the distance between the mounting face of base plate 12 and the outer edge of cam arm 14. Thus, with the elongated axis of check valve 64 coincident with the center of hole 66, and cam arm 14 oriented as shown in FIG. 6, check valve 64 may be passed completely through hole 66.

With this as background, an initial assembly or subsequent service procedure for downstream check valve 64 will now be explained in detail. FIGS. 8 through 12 show the various steps which are undertaken in handling and manipulating the check valve 64 into an installed position. Removal of the valve 64 is carried out by simply reversing the order of the installation steps.

Figure 8:
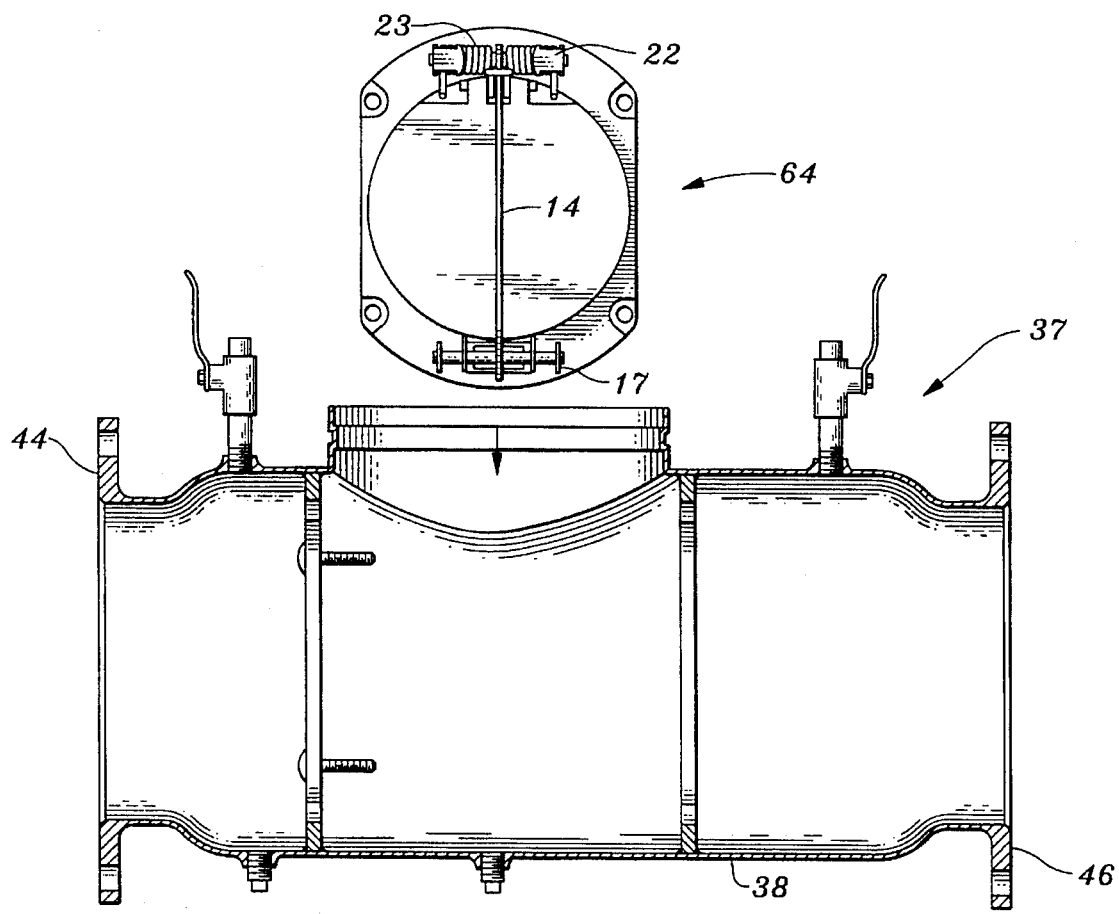
FIG. 8 is a simplified longitudinal, cross sectional view of a backflow preventer housing and a downstream check valve, showing the first step of installation.
Figure 9:
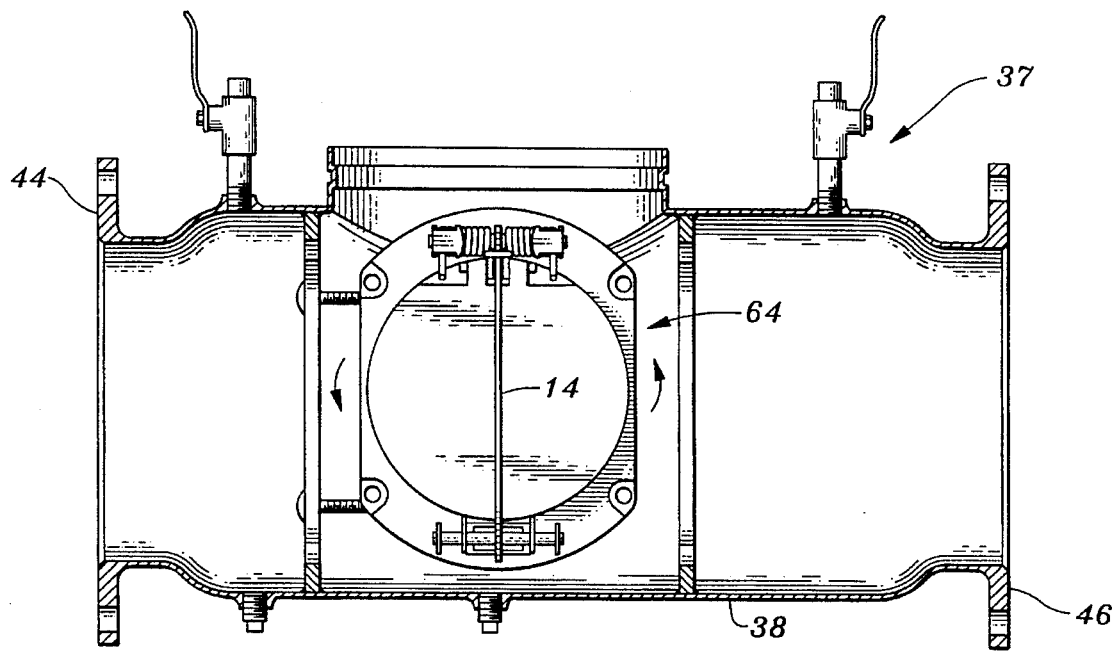
FIG. 9 is a view as in FIG. 8, showing the second step of installation.
Figure 10:
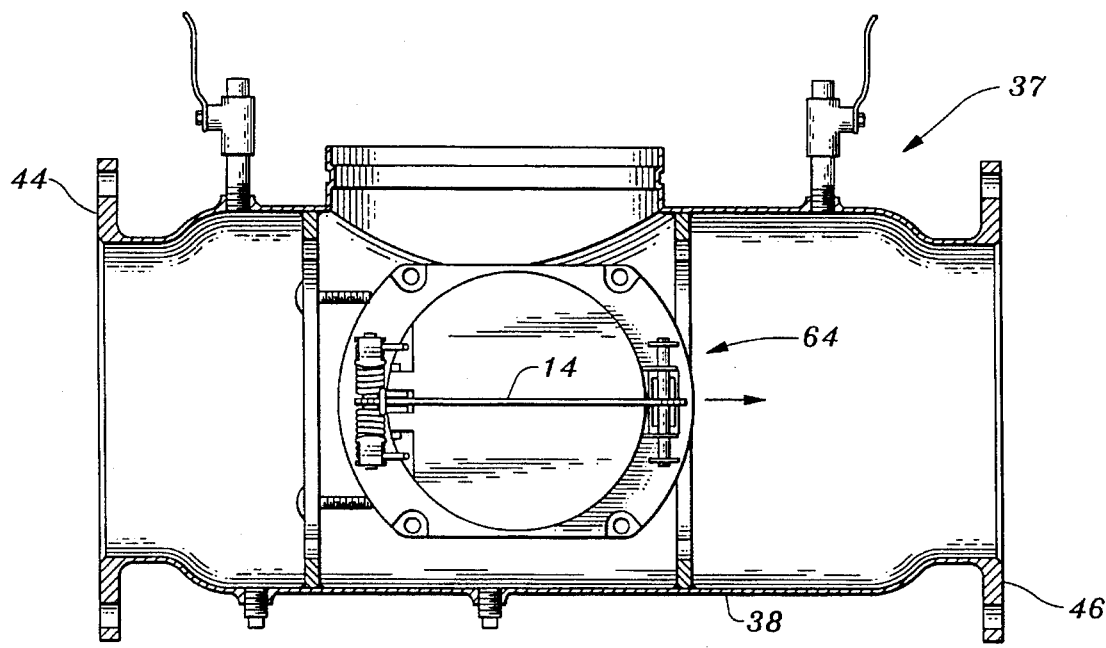
FIG. 10 is a view as in FIG. 8 showing the third step of installation.
Figure 11:
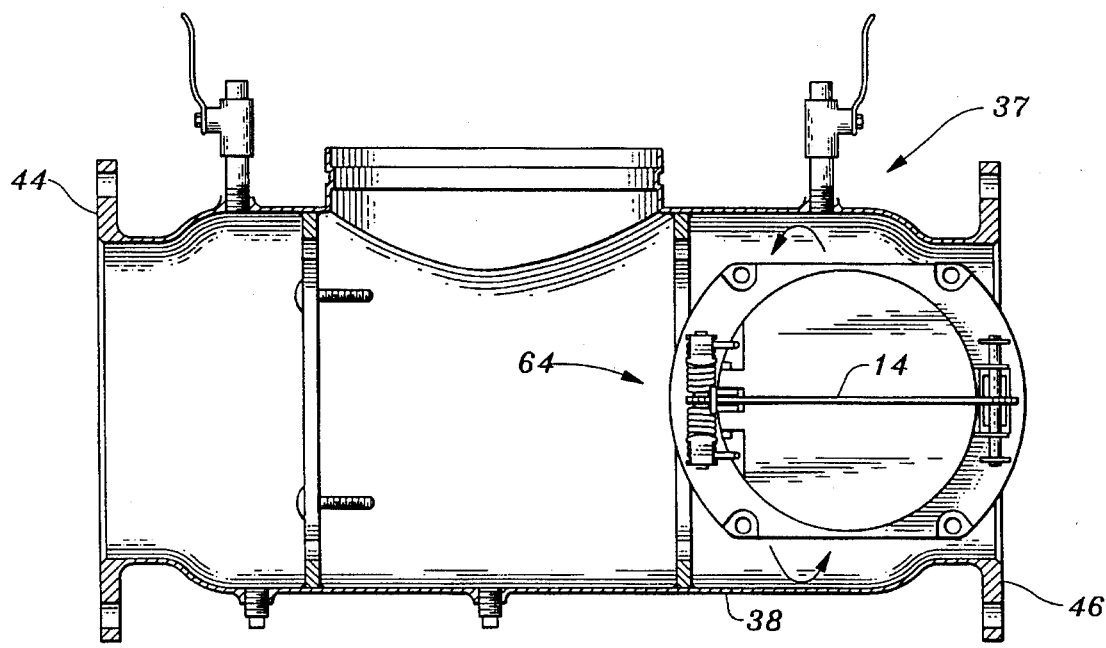
FIG. 11 is a view as in FIG. 8 showing the fourth step of installation.
Figure 12:
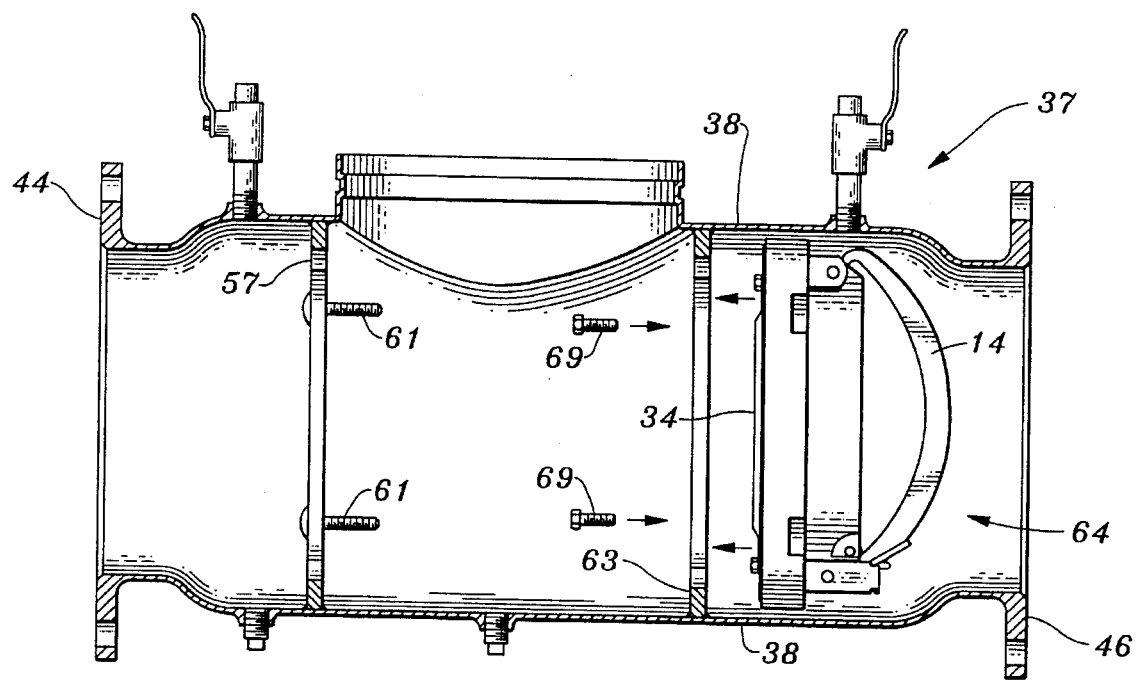
FIG. 12 is a view as in FIG. 8 showing the fifth step of installation.

In FIG. 8, the split ring and dome cover over service port 52 have been removed, allowing check valve 64 to be lowered, along the direction of its longitudinal axis, into intermediate chamber 48. The orientation of valve 64 is such, that cam brackets 22 and spring 23 are located on the upper end of the valve. The next step, shown in FIG. 9, involves a reorientation of the valve, within intermediate chamber 48. The valve is rotated in counter-clockwise fashion, about the axis of clapper 13, so that the cam brackets 22 are directed upstream and the base brackets are directed downstream. The resultant position of valve 64 is illustrated in FIGS. 6 and 10.

The valve is then passed through elongated hole 66, with sidewall cutout 67 accommodating the arcuate profile of cam arm 14. By grasping gripping bar 34, the installer is able to reorient valve 64, so that its longitudinal axis is vertical, with cam brackets 22 now located on the lower end of the valve. Concurrently, base plate 12 of the valve is oriented upstream, in adjacent, parallel relation to downstream mounting flange 63 (see, FIG. 12). Again relying upon the gripping bar, the installer draws valve 64 upstream into contingent relation with flange 63, and maintains it in that position so that flange holes 68 are aligned with downstream mounting holes 33 (see FIG. 14). Four bolts 69 are then passed through holes 68 and screwed into holes 33 to fasten valve 64 securely to plate 63. O-ring 31 is thereby compressed against plate 63, forming a hydraulic seal therewith.

After the downstream check valve is installed, the upstream check valve may be installed in the manner described above. It should also be noted that while the upstream check valve can independently be serviced without disturbing the downstream check valve, the reverse is not the case. If the downstream check valve is to be serviced, the upstream check valve must first be removed, so that sufficient clearance exists for the removal and reinstallation of the downstream check valve.

It is generally preferable to have the upstream and downstream check valves oriented with their longitudinal axes vertical, and the respective pivot rods 19 located on the upper end of each valve. This is the check valve orientation shown in FIG. 7. The reason for this preference is that it allows any incoming debris or foreign matter to pass more easily through the check valves, instead of lodging between the clapper and the base plate, and possibly defeating the reverse flow protection of the check valves.

Figure 13:
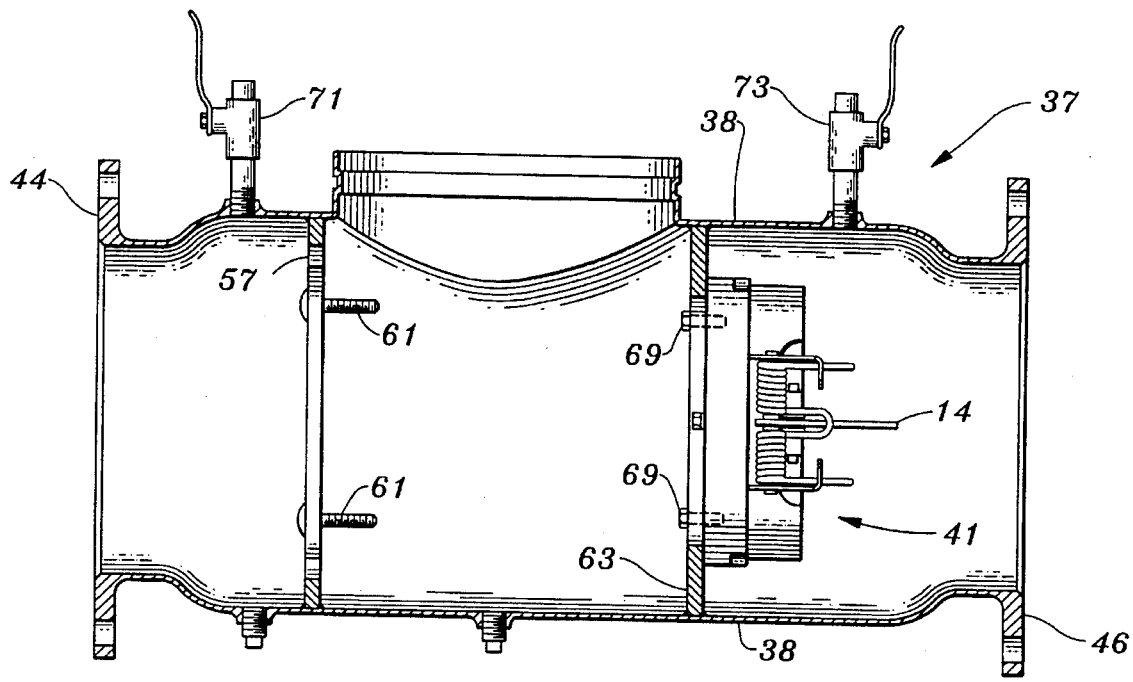
FIG. 13 is a view as in FIG. 8 showing an alternative manner of orienting the downstream check valve assembly, with the elongated mounting flange being horizontally oriented.

However, the specific orientation of the check valves is not critical to successful practice of the present invention. The longitudinal axes of either the upstream or the downstream check valves, or both, may be horizontal, for example. FIG. 13 shows such an alternative orientation for the downstream check valve assembly 41. An identical, horizontal orientation may also be used advantageously for the upstream check valve assembly 39.

If, for example, a backflow preventer is provided with an external pressure relief valve operating on the "reduced pressure" principle, it may be desirable to orient assembly 39 so that its longitudinal axis is horizontal. Such an external pressure relief valve is shown in FIG. 10 of U.S. Pat. No. 5,046,525, previously incorporated by reference. It has been determined that under very high flow rates, the turbulence created by water flowing downstream from the upstream check valve may cause a pressure relief valve to open without a fault condition existing. To alleviate this problem, the upstream check valve may be reoriented, so that the longitudinal axis of the valve is horizontal. In this way, the bulk of the turbulence is directed toward the median sidewall of the housing 38, rather than downwardly toward the sensor line of the pressure relief valve.

Housing 38 may also be provided with additional valves, fittings, and accessories. For example, FIG. 7 shows an upstream test cock 71, an intermediate test cock 72, and a downstream test cock 73. These test cocks are temporarily interconnected to pressure gauges for reading static and/or dynamic fluid pressures within the various chambers of the housing 38. In this way, proper operation and the integrity of the check valve seals can be confirmed. Plugs 74 are also included within the sidewall of housing 38, closing off respective threaded ports in communication with inlet chamber 47 and intermediate chamber 48. Removal of these plugs will allow connection to exterior lines and valves, such as the pressure relief valve, operating on the "reduced pressure" principle, discussed above.

In normal operation, a fluid flow path 51 passes freely through the backflow preventer of the present invention, by urging both upstream and downstream check valves into an open position (see, FIG. 7). If a catastrophic loss of incoming pressure occurs, the pressure differential across the check valves will not be sufficient to overcome the load or bias, imposed by cam arm 14, and the valves will close. In the event that reverse flow, or backflow pressures develop, the hydraulic forces imposed upon the downstream side of the clappers 13 will urge the check valves into a tightly closed position. These forces will further be transmitted through base 12, to compress each sealing O-ring against a respective mounting flange. Thus, greater backflow pressures effect a more positive and effective seal for both check valves 58 and 64, ensuring that no pollution of the water supply will occur.

It will be appreciated then, that I have disclosed a check valve assembly and a backflow preventer which enjoy improved reliability over prior art devices, and which allow easy access for assembly, servicing, and replacement of internal components.

What is claimed is:

1. A check valve assembly, comprising:
   a. a circular check valve mounting flange having a non-circular hole therethrough;
   b. a check valve, said valve including an elongated base plate of planar configuration having an aperture therethrough for the passage of liquid, said valve further including a clapper mounted on a downstream side of said base plate and resiliently biased for closure over a downstream side of said aperture;
   c. a fastener for securing an upstream side of said base plate to a downstream side of said mounting flange.

2. A check valve assembly for use with an elongated conduit having an upstream inlet port and a downstream outlet port disposed therein to allow passage of liquids therethrough, said assembly comprising:
   (a) a check valve mounting flange having a non-circular hole therethrough, said mounting flange being transversely secured within said conduit;
   (b) a check valve base plate having an elongated planar configuration in which a longitudinal dimension of said plate exceeds a transverse dimension of said plate, said plate further including an aperture disposed therein to allow passage of liquid therethrough;
   (c) a fastener securing an upstream side of said base plate to said mounting flange;
   (d) a clapper attached pivotally to a downstream side of said base plate to form a hinged cover which seats in said aperture to impede fluid backflow; and,
   (e) biasing means mounted on said base plate for exerting a closing force against said clapper to maintain it resiliently in position over said aperture.

3. The check valve assembly of claim 2 in which a resilient, annular seal, having substantially the same diameter as said aperture is mounted on an upstream side of said clapper, said seal being positioned to engage and seat over said aperture in response to reverse, or backflow pressure of liquid against the clapper.

4. The check valve assembly of claim 2 wherein said biasing means includes an elongated, curved cam bar having one end pivotally attached to said check valve base plate at a point opposite the point of attachment of said clapper, said cam bar extending substantially across a downstream side of said clapper, said biasing means further including a spring extending between said base and said cam bar, said spring exerting a force urging said clapper toward said check valve base plate.

5. The check valve assembly of claim 2 in which said non-circular hole of said check valve mounting flange has a longitudinal dimension slightly greater than said transverse dimension of said base plate, and said hole has a transverse dimension slightly greater than a front to rear dimension between an upstream side of said base plate and a downstream extremity of said clapper, and in which said check valve base plate may be oriented for passage from an upstream side of said mounting flange through said hole, and thereafter mounted on a downstream side of said flange.

6. A backflow preventer, comprising:
   a. an elongated, tubular housing having inlet and outlet ports for passage of liquid and at least one access port disposed between said inlet and outlet ports, said access port including a removable cover, allowing selective access to an interior of said housing;
   b. a pair of check valve assemblies arranged transversely and serially within said housing, each of said assemblies comprising: a circular check valve mounting flange having a non-circular hole therethrough; a check valve, said valve including an elongated base plate of planar configuration having an aperture therethrough for the passage of liquid, said valve further including a clapper mounted on a downstream side of said base plate and resiliently biased for closure over a downstream side of said aperture; and, a fastener for securing an upstream side of said base plate to a downstream side of said mounting flange.

7. An apparatus as in claim 6 in which one of said check valve assemblies is mounted upstream from said access port and the other of said check valve assemblies is mounted downstream from said access port.

8. An apparatus as in claim 7 in which an upstream mounting flange includes mounting bolts extending downstream, and an upstream base plate includes mounting holes therethrough accommodating said mounting bolts, and further including nuts screwed over said bolts, to secure said said upstream base plate to said upstream mounting flange.

9. An apparatus as in claim 7 in which a downstream base plate includes internally threaded mounting holes, and in which a downstream mounting flange includes holes therethrough in alignment with said mounting holes, and further including threaded bolts which extend through said holes in said flange to engage said holes in said base plate.

10. An apparatus as in claim 7 in which a downstream check valve assembly includes gripping means on its upstream side, for facilitating manipulation of said plate within said housing.

11. An apparatus as in claim 6 each of said clappers is pivotally mounted to said base plate on one side of said aperture, and in which each of said clappers is resiliently biased by an elongated, curved cam bar having one end pivotally attached to said check valve base plate at a point opposite the point of attachment of said clapper, said cam bar extending substantially across a downstream side of said clapper, said biasing means further including a spring extending between said base and said cam bar, said spring exerting a force urging said clapper toward said check valve base plate.

12. A method for installing a check valve in an elongated, tubular housing having an inlet port, and outlet port, and an access port therebetween, the housing further including a downstream check valve mounting flange transversely disposed therein downstream from the access port, the flange having a hole therein for passage of liquid through said housing, said method comprising:
   a. introducing the check valve into the housing through the access port;
   b. passing said valve through the flange hole, from an upstream side of the flange to a downstream side of the flange; and,
   c. securing said check valve to said downstream side of the flange.

13. A method as in claim 12 in which the housing includes an upstream check valve mounting flange transversely disposed therein upstream from the access port, the flange having a hole therein for passage of liquid through said housing, said method including the further steps of passing a second check valve through the access port and installing said second check valve to a downstream side of said upstream check valve mounting flange.

14. A method for installing a check valve in an elongated, tubular housing having an inlet port, and outlet port, and an access port therebetween, the housing further including a downstream check valve mounting flange transversely disposed therein, downstream from the access port, the flange having an elongated hole therein for passage of liquid, the check valve having an elongated base plate with a longitudinal dimension greater than a transverse dimension, said hole having a longitudinal dimension slightly greater then said transverse dimension of said base plate, and said hole having a transverse dimension slightly greater than a front to rear dimension between an upstream side of said check valve and a downstream side of said check valve, said method comprising:
   a. introducing the check valve into the housing through the access port;
   b. orienting the check valve with its longitudinal dimension directed toward an axis of the flange hole;
   c. passing said valve through the flange hole, from an upstream side of the flange to a downstream side of the flange; and,
   d. securing said check valve to said downstream side of the flange.

15. A method as in claim 14 in which the housing includes an upstream check valve mounting flange transversely disposed therein upstream from the access port, the flange having a hole therein for passage of liquid through said housing, said method including the further steps of passing a second check valve through the access port and installing said second check valve to a downstream side of said upstream check valve mounting flange.

16. A method for installing upstream and downstream check valves in a tubular backflow preventer housing having an inlet chamber, an intermediate chamber, and an outlet chamber arranged in serial relation, the housing also including an access port allowing selective access to the intermediate chamber, and the housing further including upstream and downstream check valve mounting flanges, the upstream mounting flange defining a transverse boundary between the inlet chamber and the intermediate chamber, and the downstream flange defining a transverse boundary between the intermediate chamber and the outlet chamber, each of said flanges having an opening therein for passage of fluid through said housing, said method comprising:

a. introducing a downstream check valve into the intermediate chamber through the access port;

b. passing said downstream check valve through the hole in the downstream flange, into the outlet chamber;

c. securing said downstream check valve to a downstream side of the downstream flange;

d. introducing an upstream check valve into the intermediate chamber through the access port; and, e. securing said upstream check valve to a downstream side of the upstream flange.

17. A check valve assembly for use with an elongated conduit having an upstream inlet port and a downstream outlet port disposed therein to allow passage of liquids therethrough, said assembly comprising:

(a) a check valve base plate having an elongated planar configuration in which a longitudinal dimension of said plate exceeds a transverse dimension of said plate, said plate further including an aperture disposed therein to allow passage of liquid therethrough;

(b) a clapper attached pivotally to a downstream side of said base plate to form a hinged cover which seats in said aperture to impede fluid backflow;

(c) biasing means mounted on said base plate for exerting a closing force against said clapper to maintain it resiliently in position over said aperture, said biasing means including an elongated, curved cam bar having one end pivotally attached to said check valve base plate at a point opposite the point of attachment of said clapper, said cam bar extending substantially across a downstream side of said clapper, said biasing means further including a spring extending between said base plate and said cam bar, said spring exerting a force urging said clapper toward said check valve base plate;

(d) a check valve mounting flange including an elongated hole therethrough, said hole having a longitudinal dimension slightly greater than said transverse dimension of said base plate, and said hole having a transverse dimension slightly greater than a front to rear dimension between an upstream side of said base plate and a downstream extremity of said cam bar, and in which said check valve base plate may be oriented for passage from an upstream side of said mounting flange through said hole; and, (e) a fastener securing an upstream side of said base plate to a downstream side of said flange, after said base plate is passed through said hole.

\* \* \* \* \*